United States Patent [19]
Hirunuma et al.

[11] Patent Number: 6,067,195
[45] Date of Patent: *May 23, 2000

[54] BINOCULARS HAVING HAND-VIBRATION COMPENSATION SYSTEM

[75] Inventors: Ken Hirunuma, Tokyo; Shinji Tsukamoto, Saitama-ken; Moriyasu Kanai, Tokyo; Tetsuo Sekiguchi, Saitama-ken, all of Japan

[73] Assignee: Asahi Kogaku Kogyo Kabushiki Kaisha, Tokyo, Japan

[*] Notice: This patent is subject to a terminal disclaimer.

[21] Appl. No.: 09/203,525

[22] Filed: Dec. 1, 1998

[30] Foreign Application Priority Data

Dec. 2, 1997 [JP] Japan .................................. 9-331658

[51] Int. Cl.[7] ............................ G02B 27/64; G02B 23/00
[52] U.S. Cl. .......................... 359/557; 359/407; 359/554
[58] Field of Search ..................................... 359/407–420, 359/554–557, 431, 480–482, 813–814, 823–824, 831–837; 396/52–55; 348/208

[56] References Cited

U.S. PATENT DOCUMENTS

| | | | |
|---|---|---|---|
| 4,013,339 | 3/1977 | Ando et al. | 359/556 |
| 5,231,534 | 7/1993 | Kato | 359/432 |
| 5,754,339 | 5/1998 | Kanai et al. | 359/557 |
| 5,768,016 | 6/1998 | Kanbara | 359/557 |
| 5,917,653 | 6/1999 | Taniguchi | 359/557 |

*Primary Examiner*—Thong Nguyen
*Attorney, Agent, or Firm*—Greenblum & Bernstein, P.L.C.

[57] ABSTRACT

A binocular is provided with a pair of telescopic optical systems. Each of the pair of telescopic optical systems has an objective lens system, an erecting optical system, and an observing optical system. The erecting optical system of each of the telescopic optical systems may be a type I or type II Porro prism, which is divided into two sub prisms respectively have two reflection surfaces. First and second hand vibration compensation mechanism is provided: (a) between the objective lenses and erecting optical systems; and (b) between the first sub prisms and the second sub prisms.

9 Claims, 10 Drawing Sheets

BINOCULARS HAVING HAND-VIBRATION COMPENSATION SYSTEM

BACKGROUND OF THE INVENTION

The present invention relates to a binocular having a hand-vibration compensation system.

Recently, binoculars provided with hand-vibration compensation systems for preventing vibration of observed image due to hand-vibration of a user have been developed. One example of the hand-vibration compensation system is constructed such that a lens for compensating the hand-vibration is provided within an optical path of each telescopic optical system of a binocular. The lens is driven in a plane perpendicular to an optical axis of the binocular. Generally, in such a type of the compensation system, a mechanism for moving the lenses of the both telescopic optical systems in a vertical direction and a mechanism for moving the other lenses, which are also provided within the optical paths of the telescopic optical systems, in a horizontal direction are separately but adjacently arranged. In this type of compensation system, since the lens driving directions are different (i.e., one is to be moved in a vertical direction and the other is to be moved in a horizontal direction), two different mechanisms are to be provided for respective compensation directions. However, in view of manufacturing cost, it is preferable that the vertical compensation mechanism and the horizontal compensation mechanism have the same structure since the number of kinds of parts can be reduced.

SUMMARY OF THE INVENTION

It is therefore an object of the present invention to provide hand-vibration compensation system having the same mechanisms, which are capable of compensating the hand-vibration both in the vertical and horizontal directions, respectively.

For the above object, according to the present invention, there is provided a binocular, which includes: a pair of telescopic optical systems, each of which has an objective lens system, an erecting optical system, and an observing optical system, wherein the erecting optical system of each of the telescopic optical systems including a first prism and a second prism, the first prism and the second prism respectively having two reflection surfaces; a first hand vibration compensation mechanism, that compensates trembling of image due to a hand vibration in a first direction perpendicular to a plane including optical axes of both of the telescopic optical systems; a second hand vibration compensation mechanism, that compensates trembling of image due to a hand vibration in a second direction which is (1) parallel to a plane perpendicular to the optical axes of said telescopic optical systems, and (2) perpendicular to the first direction, wherein one of the first and second hand-vibration compensation mechanism is provided between the objective lens system and the erecting optical system, and the other of the first and second hand vibration compensation mechanism is provided between the first prism and the second prism.

In particular, the first prism of each of the telescopic optical systems rotates an image formed by the objective lens system in the same direction by 90 degrees.

In such a case, it becomes possible that the first hand vibration compensation mechanism and the second hand vibration compensation mechanism have the same structure.

In particular, same structure may be provided with: a rotatable arm which is rotatable about an axis defined at a center of the optical axes of both of the telescopic optical systems; a pair of compensation lenses held at both ends of the rotatable arm, the pair of lenses being inserted in optical paths of both of the telescopic optical systems; and an actuator to be controlled to rotate the rotatable arm.

Alternatively, the same structure is provided with: a movable frame which is movable in a direction perpendicular to an plane including the optical axes of both of the telescopic optical systems; a pair of compensation lenses held by the movable frame, the pair of lenses being inserted in optical paths of both of the telescopic optical systems; and an actuator to be controlled to move the movable frame.

Further alternatively, the same structure may be provided with: a movable frame which is movable in a direction perpendicular to an plane including the optical axes of both of the telescopic optical systems; a pair of compensation lenses held by the movable frame, the pair of lenses being inserted in optical paths of both of the telescopic optical systems; a magnet field generating system which generates a magnet field around the movable frame; and a coil fixed to the movable frame, wherein, when electrical current flows through the coil, the movable frame is driven to move in the direction perpendicular to the plane including the optical axes of both of the telescopic optical systems.

Still alternatively, the same structure comprises: a pair of frame members respectively holding compensation lenses which are inserted in optical paths of both of the telescopic optical systems, each of the frame members being movable in a direction perpendicular to both of optical axes of the telescopic optical systems; and an actuator to be controlled to move the pair of frame members simultaneously in opposite directions.

In one particular case, the first and second prisms constitute a type I Porro prism.

Alternatively, the first and second prisms constitute a type II Porro prism.

DESCRIPTION OF THE ACCOMPANYING DRAWINGS

DESCRIPTION OF THE EMBODIMENTS

[First Embodiment]

Figure 1:
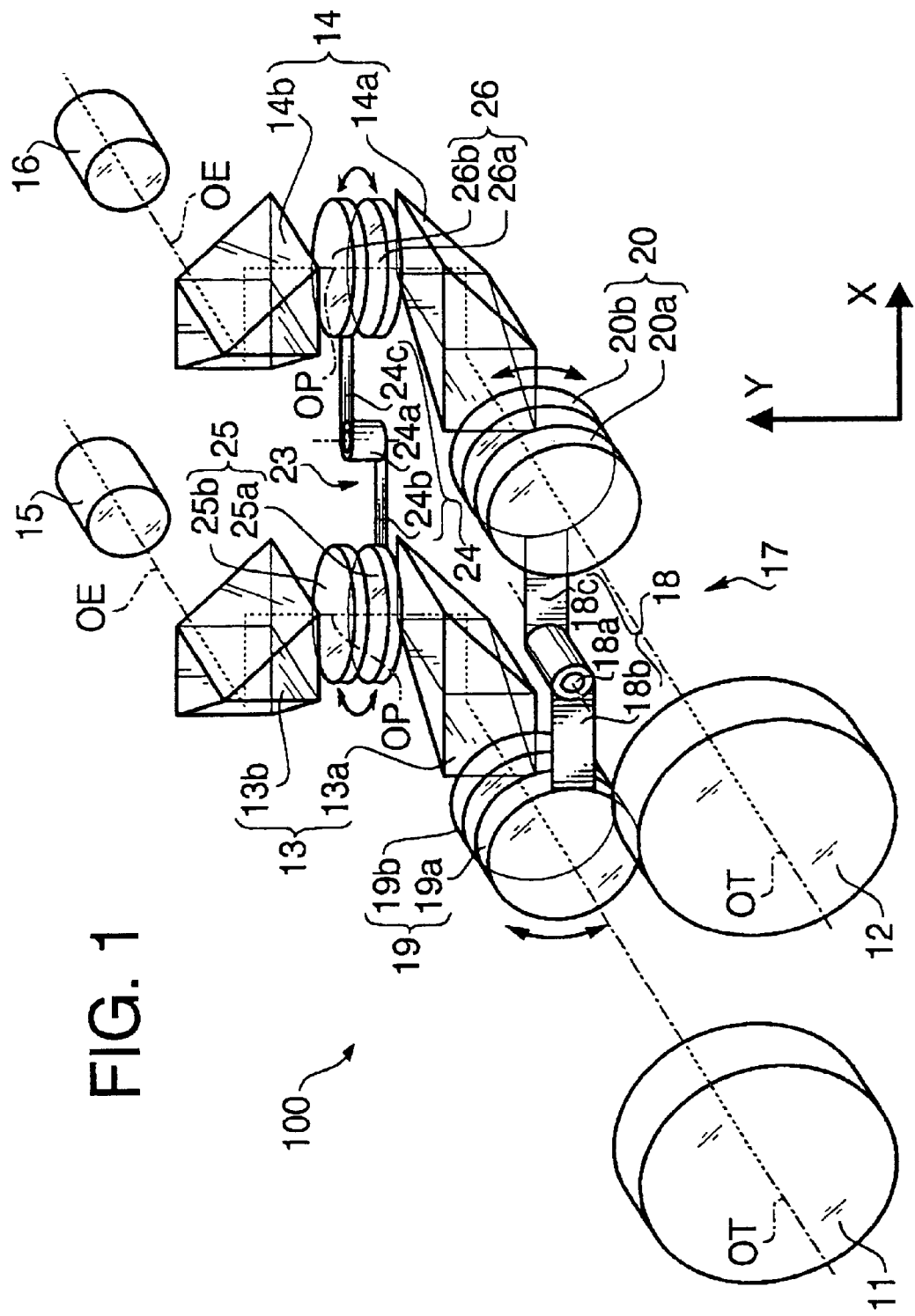
FIG. 1 is a perspective view of an optical system showing arrangement of optical elements of a binocular according to a first embodiment of the invention.

FIG. 1 shows an optical system 100 of a binocular according to a first embodiment of the invention. The binocular is provided with a pair of telescopic optical systems for right and left eyes of a user. It should be noted that, in the accompanying drawings, an X-Y axis system is indicated to clarify the direction referred to. The Y axis corresponds to the up/down direction of the user when the binocular is held horizontally by the user, and the X axis corresponds to the right/left direction of the user of the binocular when held horizontally.

Figure 12:
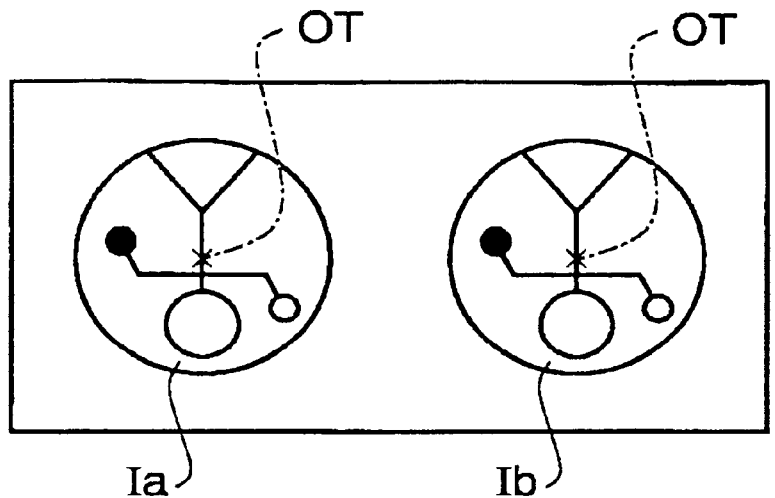
FIG. 12 shows orientation of the images at a position between the objective lens and the erecting optical system.

At a front end of the telescopic optical system for the right eye (on the left-hand side in FIG. 1), a right objective lens 11 is provided, and at a front end of the telescopic optical system for the left eye (on the right-hand side in FIG. 1), a left objective lens 12 is provided. Behind each of the right objective lens 11 and the left objective lens 12, erecting optical systems 13 and 14, each of which has four reflection surfaces, are provided. The objective lenses 11 and 12 respectively form reversed images Ia and Ib, an example of such images are illustrated in FIG. 12.

It should be noted that, although the objective lenses and eye-piece lenses are described as a single lens in the embodiments, each of the lenses may include a plurality of groups and/or a plurality of lenses.

The erecting optical system 13 included in the right eye telescopic optical system has first and second sub prisms 13a and 13b, which are arranged in a direction perpendicular to a plane including both of the optical axes OT of the right and left eye telescopic optical system (i.e., arranged in the Y direction). Specifically, the sub prisms 13a and 13b are formed by dividing a type II Porro prism in to two separate elements. Each of the sub prisms 13a and 13b has two reflection surfaces.

The first sub prism 13a is arranged so as to form a rotated image Ic (see FIG. 13) which is rotated, with respect to the reversed image Ia, by 90 degrees in a clockwise direction viewed from the eyepiece lens side. The light reflected inside the first sub prism 13a is then incident on the second sub prism 13b in which the light is reflected by the two reflection surfaces so that the erected image becomes observable through the right eyepiece lens 15.

Similar to the erecting optical system 13, the left eye erecting optical system 14 includes a first and second sub prisms 14a and 14b which are formed by dividing the type II Porro prism. It should be noted that orientation of the sub prisms 13a and 14a is similar, and orientation of the sub prisms 13b and 14b is similar. In other words, if the sub prisms 13a and 13b are shifted to the sub prisms 14a and 14b, they overlap.

With this structure, the second sub prism 14a rotates the reversed image Ib to form a rotated image Id (see FIG. 13), which is rotated, with respect to the reversed image Ia, by 90 degrees in a clockwise direction. The light reflected inside the first sub prism 14a is then incident on the second sub prism 14b in which the light is reflected by the two reflection surfaces so that the erected image becomes observable through the left eyepiece lens 16.

The optical axis of the right (or left) eye telescopic optical system includes the optical axis OT which extends from the objective lens 11 (or 12) to the erecting optical system 13 (or 14), an optical axis OP defined between the first and second sub prisms 13a and 13b (or 14a and 14b), and an optical axis OE extending from the erecting optical system 13 (or 14) to the eyepiece lens 15 (or 16). The axes OT and OE are parallel, and the axis OP is perpendicular to the axes OT and OE.

Figure 2A:
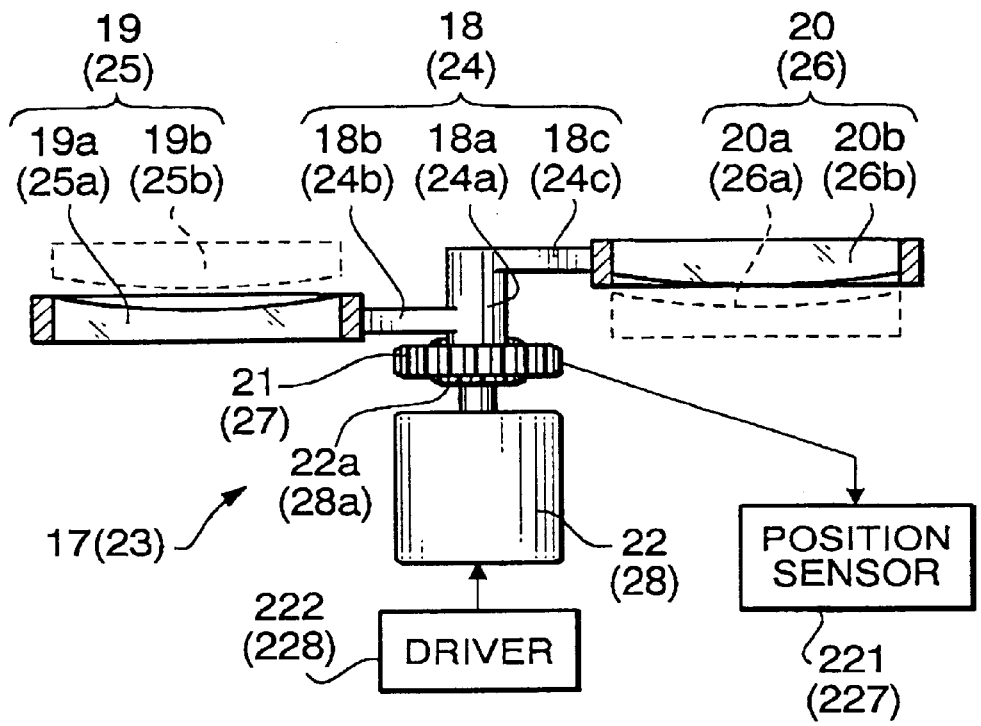
FIG. 2A shows a schematic structure of a hand-vibration compensation mechanism viewed in a direction perpendicular to the optical axis of the binocular shown in FIG. 1.
Figure 2B:
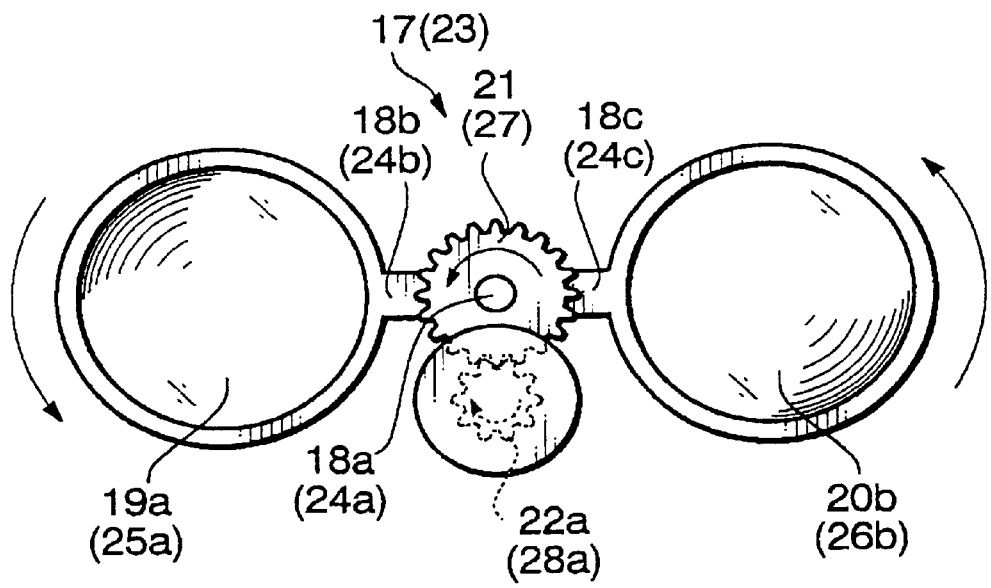
FIG. 2B shows a schematic structure of the hand-vibration compensation mechanism viewed in a direction parallel to the optical axis shown in FIG. 1.

In the binocular according to the embodiment, between the objective lens (11 or 12) and the first sub prism (13a or 14a), an up/down hand vibration compensation mechanism 17 (hereinafter referred to as the up/down compensation mechanism) is provided. The up/down compensation mechanism 17 includes a rotatable arm 18. The rotatable arm 18 holds the right and left compensation lenses 19 and 20. The rotation axis 18a of the rotatable arm 18 is located at the center of the both of the optical axes OT of the right and left telescopic optical systems, and extends in parallel to the optical axes OT. In the direction perpendicular to the rotation axis 18a (i.e., in the X-axis direction in FIG. 1), a right compensation lens frame 18b and a left compensation lens frame 18c extend in opposite directions. The right and left compensation lenses are arranged such that the optical axes OT intersect the right and left compensation lenses 18b and 18c. As shown in FIGS. 2A and 2B, the up/down compensation mechanism includes a negative lens 19a and a positive lens 19b, which are arranged along the optical axis OT of the right eye telescopic optical system, and the left compensation optical system includes a negative lens 20a and a positive lens 20b, which are arranged along the optical axis OT of the right eye telescopic optical system. The right compensation lens frame 18b holds the negative lens 19a, and the left compensation lens frame 18c holds the positive lens 20b. Therefore, the right compensation lens frame 18b and the left compensation lens frame 18c are apart by a predetermined amount along the optical axes OT.

The negative lenses 19a and 20a are the same lenses, and the positive lenses 19b and 20b are the same lenses. Further, the lenses 19a and 20b are formed such that, when these lenses are decentered (i.e., the optical axis of the lenses 19a and 20b are moved in a direction perpendicular to the optical axes OT), the optical paths of light passed through the lenses 19a and 20b shift by the same amount but in the opposite directions. The positive lens 19b and the negative lens 20a, which are not held by the rotatable arm 18, are arranged such that the optical axes thereof coincide with the optical axes OT, respectively.

To the front end (i.e., the object side end) of the rotation axis 18a, a driving gear 21 is secured, with which a pinion gear 22a of a motor 22 is engaged. The motor 22 is driven to rotate in either direction such that the pinion gear 22a is rotated in a forward or reverse direction. As shown in FIG. 2B, when the pinion gear 22a is rotated in the clockwise direction in the drawing, the arm 18 is driven to rotate in the counterclockwise direction about the rotation axis 18a via the driving gear 21. When the pinion gear 22a is rotated in the counterclockwise direction in the drawing, the arm 18 is rotated in the clockwise direction.

As described above, by rotating the arm 18 with the motor 22, the negative lens 19a and the positive lens 20b which are arranged on the opposite positions with respect to the rotation axis 18*a* can be displaced in opposite directions within a plane perpendicular to the optical axes OT and OT of the telescopic optical systems. Since each of the negative lens 19*a* and the positive lens 20*b* moves along a circle whose center is the rotation axis 18*a*, when displaced, the negative lens 19*a* and the positive lens 20*b* are displaced in the right/left direction (i.e., in the X-axis direction in FIG. 1) as well as in the up/down direction (i.e., in the Y-axis direction in FIG. 1). However, the amount of displacement in the right/left direction is small and can be ignored. Thus, the negative lens 19*a* and the positive lens 20*b* are moved mainly in the up/down direction when the rotatable arm 18 is rotated.

It should be noted that when the rotatable arm 18 is rotated, the negative lens 19*a* and the positive lens 20*b* are moved in the opposite directions with respect to the reversed images Ia and Ib. However, as described above, the positions of the reversed images Ia and Ib are shifted in the same direction.

As shown in FIG. 2A, a position sensor 221 is provided to detect a rotational position of the arm 18 with respect to its initial position. It should be noted that, the optical axes of the lenses 19*a* and 20*b* coincide with the optical axes OT when positioned at the initial position.

Figure 3:
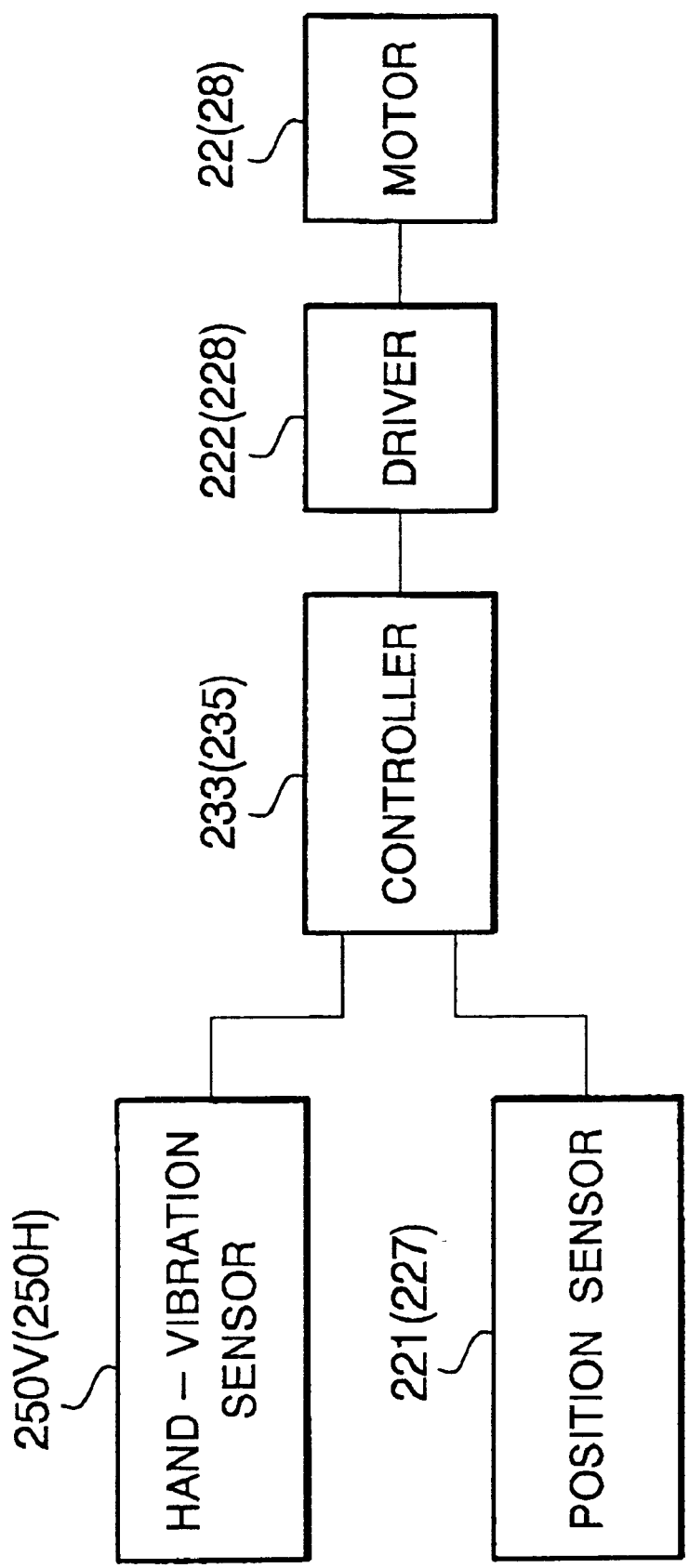
FIG. 3 shows a block diagram illustrating a control system for driving the hand-vibration compensation mechanisms.

Further, as shown in FIG. 3, the up/down compensation mechanism is provided with a hand-vibration sensor 250V for detecting the hand-vibration of a component in the up/down direction (i.e., Y-axis direction in FIG. 1). Output signals of the hand-vibration sensor 250V and the position sensor 221 are input to a controller 233. The controller 233 calculates amount of movement in the up/down direction due to the hand-vibration, and controls a driver 222 to drive the motor 22 by an amount corresponding to the amount of movement due to the hand-vibration. Specifically, the controller 233 determines a target position to which the arm 18 is to be positioned for canceling change of the position of the image due to the hand-vibration based on the amount of movement detected by the hand-vibration sensor. Then, the controller 233 controls the driver to move the arm to the calculated target position with monitoring the position detected by the position sensor. As the above control is continuously executed, the controller 233 continuously updates the target position, and accordingly, trembling of the images due to the hand-vibration in the up/down direction can be compensated.

The right/left compensation mechanism 23 is arranged between the first sub prisms 13*a* and 14*a*, and the second sub prisms 13*b* and 14*b*. As shown in FIG. 1, the right/left compensation mechanism 23 is inserted in the optical axes OP defined between the first and second sub prisms. As shown in FIGS. 2A and 2B, the right/left compensation mechanism 23 has the same structure as the up/down compensation mechanism 17. The right/left compensation mechanism 23 includes a rotatable arm 24 which is located between the right and left optical axes OP and extends in a direction parallel to the optical axes OP. The rotatable arm 24 is made rotatable about an rotation axis 24*a*. The rotatable arm 24 has a right compensation lens holding frame 24*b* and a left compensation lens holding frame 24*c*.

The right/left compensation mechanism 23 includes right and left compensation optical systems 25 and 26, each of which includes a negative lens 25*a* (26*a*) and a positive lens 25*b* (26*b*) which are arranged along the optical axis OP. The negative lens 25*a* and the positive lens 26*b* are held by the right compensation lens holding frame 24*b* and the left compensation lens holding frame 24*c*, respectively. The positive lens 25*b* and the negative lens 26*a*, which are not held by the lens holding frames 24*b* and 24*c* are fixed inside the binocular such that the optical axes thereof coincide with the optical axes OP and OP, respectively.

To the front end of the rotation axis 24*a*, a driving gear 27 is secured, with which a pinion gear 28*a* of a motor 28 is engaged. The motor 28 is driven to rotate in either direction such that the pinion gear 28*a* is rotated in a forward or reverse direction. As the pinion gear 28*a* is rotated, the arm 24 is rotated.

The optical axis OP defined between the first sub prism 13*a* (14*a*) and the second sub prism 13*b* (14*b*) is an axis which extends in a direction perpendicular to a plane including the optical axes OT of the objective lens systems (i.e., in the Y-axis direction). Accordingly, the rotation arm 24 is arranged such that the rotation axis 24*a* is perpendicular to the rotation axis 18*a* of the rotatable arm 18. With this construction, in the compensation mechanism 23, the negative lens 25*a* and the positive lens 26*b* are rotatable within a plane perpendicular to the optical axes OT and OT. In other words, the same mechanism is used for the right/left compensation mechanism 23 and for the up/down compensation mechanism 17 only by changing the direction of the rotation axis.

It should be noted that at the position where the right/left compensation mechanism 23 is provided, the images Ic and Id have been rotated by 90 degrees, with respect to the images Ia and Ib, by the first sub prisms 13 and 14, respectively. Therefore, by rotating the rotatable arm 24, trembling of the observed image due to the hand vibration in the right/left direction of the images Ic and Id can be compensated. The negative lens 25*a* and the positive lens 26*b* move in the opposite directions. However, since the two lenses 25*a* and 26*b* are negative and positive lenses, the compensation is made in the same direction. Thus, by rotating the rotatable arm 24, the hand vibration applied to the binocular in the right/left direction is compensated.

As shown in FIG. 2A, a position sensor 227 is provided to detect a rotational position of the arm 24 with respect to the initial position.

Further, as shown in FIG. 3, the right/left compensation mechanism is provided with a hand-vibration sensor 250H for detecting the hand-vibration of a component in the right/left direction (i.e., X-axis direction in FIG. 1). Output signals of the hand-vibration sensor 250H and the position sensor 227 are input to a controller 235. The controller 235 calculates amount of movement in the right/left direction due to the hand-vibration, and controls a driver 228 to drive the motor 28 by an amount corresponding to the amount of movement due to the hand-vibration. Specifically, the controller 235 determines a target position to which the arm 24 is to be positioned for canceling change of the position of the image due to the hand-vibration based on the amount of movement detected by the hand-vibration sensor 250H. Then, the controller 233 controls the driver 228 to move the arm 24 to the calculated target position with monitoring the position detected by the position sensor 227. As the above control is continuously executed, the controller 235 continuously updates the target position, and accordingly, trembling of the image due to the hand-vibration in the right/left direction can be compensated.

As described above, since the erecting optical system is divided into sub prisms respectively having two reflection surfaces, it becomes possible to obtain a space where light corresponding to an image which is rotated by 90 degrees, with respect to the reversed image formed between the objective lens and the erecting prism, is obtained.

Accordingly, the compensation mechanism having the same structures can be used for compensating the hand vibration in the up/down direction and for the hand vibration in the right/left direction. That is, the up/down compensation mechanism 17 and the right/left compensation mechanism 23 have the same structure. Since the same structure is employed, the number of kinds of parts for the up/down and right/left compensation mechanisms 17 and 23 can be reduced in comparison to a case where the two compensation mechanisms have different structures.

The present invention is directed to part of a binocular that includes hand-vibration sensors, sensors for detecting the position of the compensation lenses, and such elements have thus been shown generally in FIG. 3. However, the details of the hand-vibration sensors and/or position detection sensors do not form part of the invention. These are provided to assist in understanding of the invention, and any types of suitable hand-vibration sensors and/or position detecting sensors could be employed to control the up/down compensation mechanism and/or the right/left compensation mechanism.

[Second Embodiment]

Figure 4:
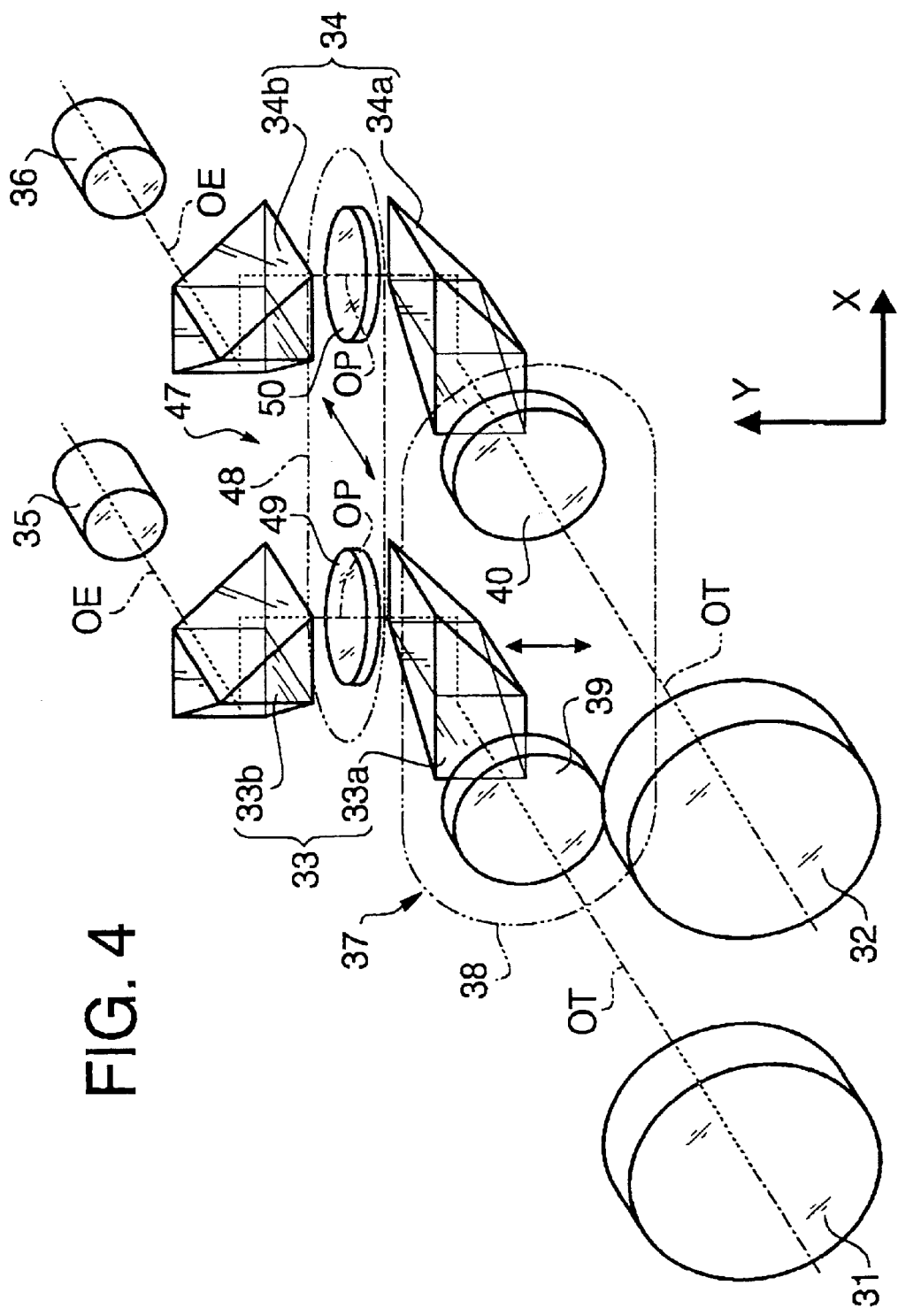
FIG. 4 is a perspective view showing arrangement of optical elements of a binocular according to a second embodiment of the invention.
Figure 5:
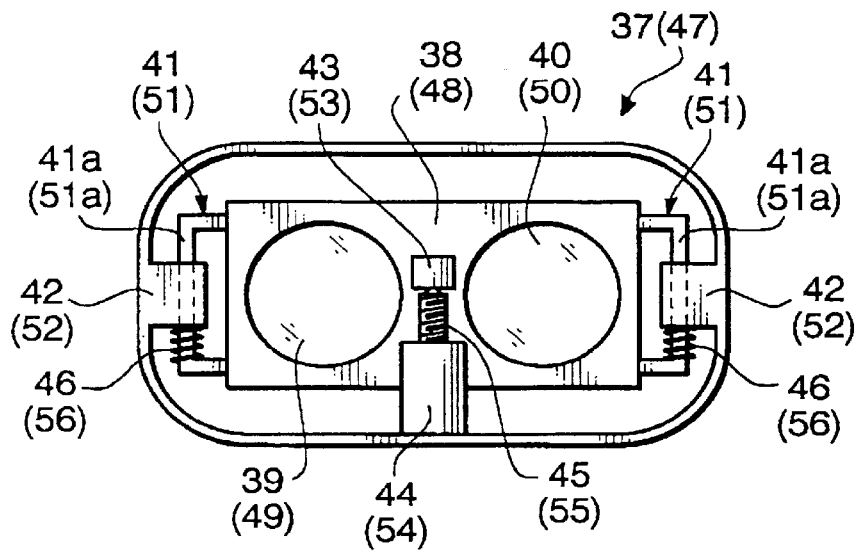
FIG. 5 shows a schematic structure of the hand-vibration compensation mechanism viewed in a direction parallel to the optical axis shown in FIG. 4.

FIG. 4 is a perspective view of an arrangement of optical elements of a binocular according to a second embodiment of the invention. FIG. 5 schematically shows a hand vibration compensation mechanism employed in the binocular according to the second embodiment.

As shown in FIG. 4, the binocular according to the second embodiment includes right and left objective lenses 31 and 32, right and left erecting optical systems 33 and 34, and right and left eyepiece optical systems 35 and 36.

The erecting optical system 33, which is a type II Porro prism, for right eye is divided into first and second sub prisms 33a and 33b; and the erecting optical system 34, which is also the type II Porro prism, for left eye is also divided into first and second sub prisms 34a and 34b.

The optical axis of the right (or left) eye telescopic optical system includes an optical axis OT which extends from the objective lens 31 (or 32) to the erecting optical system 33 (or 34), and optical axis OP defined between the first and second sub prisms 33a and 33b (or 34a and 34b), and an optical axis OE which extends from the erecting optical system 33 (or 34) to the eyepiece lens 35 (or 36). The axes OT and OE are parallel to each other, and the axis OP is perpendicular to the axes OT and OE.

Figure 13:
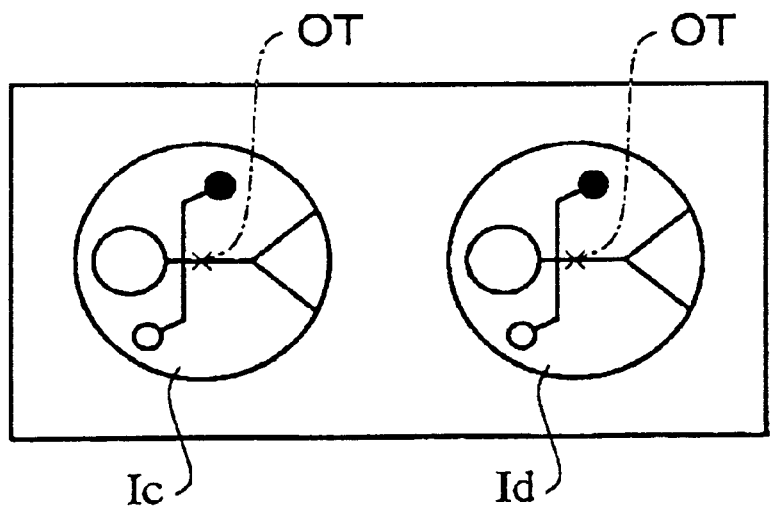
FIG. 13 shows orientation of the images at a position between the first and second sub prisms.

On the optical axis OT, i.e., between the objective lens 31 (or 32) and the erecting optical system 33 (or 34), an image Ia (or Ib) of the object is reversed as shown in FIG. 12. On the optical axis OP, i.e., between the first and second sub prisms 33a and 33b (or 34a and 34b), an image Ic (or Id) which is rotated by 90 degrees with respect to the image Ia (or Ib) is formed (rotated) by the first sub prism 33a (or 34a) as shown in FIG. 13. By the second sub prism 33b (or 34b), the image is erected, which is observed through the eyepiece lens 35 (or 36).

Between the objective lenses 31 and 32, and the first sub prisms 33a and 34a, an up/down hand vibration compensation mechanism 37 is provided. The up/down compensation mechanism 37 has, as shown in FIG. 5, a rectangular lens frame 38 which holds a pair of compensation lenses 39 and 40 at openings formed thereon. The compensation lenses 39 and 40 are provided to intersect the optical axes OT for right and left telescopic optical systems. The pair of compensation lenses 39 and 40 are the same lens. At longitudinal side ends of the lens frame 38, a pair of guide bars 41 and 41 are provided. Linear slide guide bars 41a and 41a are slidably fitted in through-holes formed in a pair of arms 42 and 42 which are formed inside the body of the binocular. With this structure, the lens frame 38 is movable in the up/down direction (i.e., the Y-axis direction in FIG. 4) which is a direction perpendicular to a plane including the optical axes OT of both the telescopic optical systems.

On a surface of the lens frame 38, which is a surface perpendicular to the optical axes OT, a projection 43 is formed between the pair of compensation lenses 39 and 40. On the body of the binocular, an actuator 44 is provided, and a plunger 45 of the actuator 44 abuts the side surface of the projection 43. The actuator 44 is constituted such that when an electrical power is applied thereto, the plunger 45 protrudes/retracts in the up/down direction (i.e., the Y-axis direction) in FIG. 5. Accordingly, when electrical power is applied to the actuator 44 to make the plunger 45 protrude, the projection 43 is pushed thereby and the lens frame 38 moves in upward direction in FIG. 5.

As shown in FIG. 5, coil springs 46 are provided to the linear slide guide bars 41a and 41a to bias the lens frame 38 in the downward direction in FIG. 5 with respect to the body of the binocular. Thus, when the actuator 44 is driven so that the plunger 45 protrudes, the lens frame 38 moves in upward direction in FIG. 5, while when the actuator 44 is driven so that the plunger 45 retracts, then due to force of the coil springs 46, the projection 43 is kept contacting the plunger 45, i.e., the lens frame 38 moves in the downward direction in FIG. 5. Thus, by driving the actuator 44, the lens frame 38 moves in a direction perpendicular to a plane including the optical axes OT of the right and left telescopic optical systems, that is, in the up/down direction in FIG. 5 (i.e., in the Y-axis direction in FIG. 4).

At the position where the compensation mechanism 37 is provided, the direction of movement of the lenses 39 and 40 coincides with the up/down direction of the reversed image. Therefore, by controlling the actuator 44 in accordance with the signal indicative of the hand vibration in the up/down direction, trembling of the images due to the hand-vibration in the up/down direction (i.e., Y-axis direction) can be compensated.

Between the first sub prisms 33a and 34a, and the second sub prisms 33b and 34b, a right/left compensation mechanism 47 is provided. Since the right/left compensation mechanism 47 has the same structure as the up/down compensation mechanism 37, reference numerals for the right/left compensation mechanism 47 are indicated in FIG. 5 in parentheses.

The right/left compensation mechanism 47 includes a rectangular lens frame 48 which holds a pair of compensation lenses 49 and 50 at openings formed thereon. The compensation lenses 49 and 50 are provided to intersect the optical axes OT for right and left telescopic optical systems. The compensation lenses 49 and 50 are the same lenses. At longitudinal side ends of the lens frame 48, guide bars 51 and 51 are provided. Linear slide guide bars 51a and 51a are slidably fitted in through-holes formed in a pair of arms 52 and 52 which are formed on the inner surface of the body of the binocular. With this structure, the lens frame 48 is movable in the right/left direction (i.e., in the X-axis direction) which is a direction perpendicular to the optical axes OT, and also is perpendicular to the X-axis direction (i.e., parallel to the Y axis direction).

On a surface of the lens frame 48, a projection 53 is formed. On the body of the binocular, an actuator 54 is provided, and a plunger 55 of the actuator 54 abuts the side surface of the projection 53. As shown in FIG. 5, coil springs 56 are provided to the linear slide guide bars 51a and 51a. By driving the actuator 54, the plunger 55 pushes the projection 53 in the Y axis direction, and accordingly, the lens frame 48 moves in a direction perpendicular to a plane including the optical axes OP, i.e., in a direction parallel to the optical axes OT.

At the position where the compensation mechanism 47 is provided, the images Ic and Id have been rotated in the same direction by 90 degrees with respect to the images Ia and Ib. Therefore, the direction of movement of the lenses 49 and 50 coincides with the right/left direction of the images Ic and Id. Therefore, by controlling the actuator 54 in accordance with the signal indicative of the hand vibration in the right/left direction, trembling of the images due to the hand-vibration in the right/left direction can be compensated.

In the second embodiment, a control system similar to that shown in FIG. 3 or any other suitable control systems including the hand-vibration sensor and the position sensor for detecting the position of the frame 38 can be used. Since the control system has been described above with reference to FIG. 3, description and drawing of the control system applicable to the second embodiment will be omitted.

[Second Embodiment—Alternative Structure]

Figure 6:
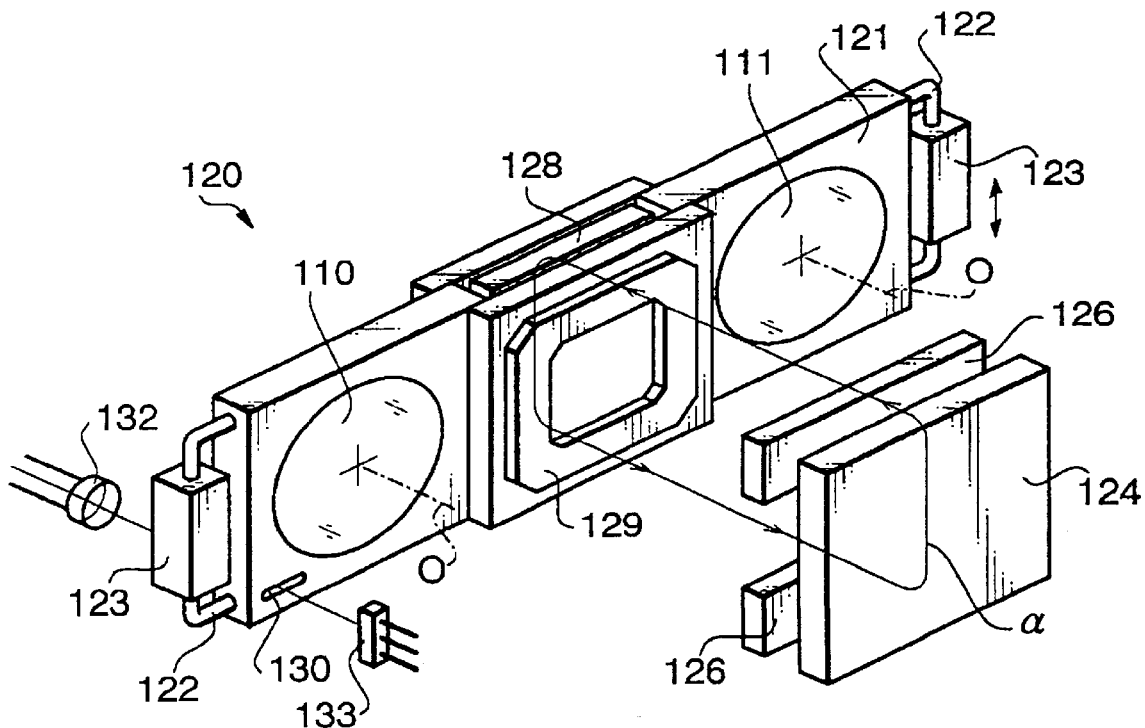
FIG. 6 shows a modified structure of a hand-vibration compensation mechanism.

FIG. 6 shows a compensation mechanism 120, which is an alternative to the mechanism shown in FIG. 5. That is, the compensation mechanism 120 can be used instead of the compensation mechanisms 37 and 47 in FIG. 4.

The mechanism 120 has a lens frame 121, which is provided with a pair of guide bars 122 at its longitudinal end portions. The guide bars 122 are slidably fitted in through holes formed in supporting arms 123, respectively. The lens frame 121 holds compensation lenses 110 and 111, which are movable in a direction perpendicular to a plane including the optical axes OT of both of the telescopic optical systems of the binocular.

On one side of the lens frame 121, a yoke plate 124 is provided, and between the yoke plate 124 and the lens frame 121, a pair of permanent magnets 126 are provided. Each of the permanent magnets 126 elongated and extends in a direction perpendicular to the direction in which the lens frame 121 is movable, and the pair of permanent magnets 126 are arranged in parallel to each other. At the central portion of the lens frame 121, another yoke plate 128 is secured. With this structure, a magnetic field represented by line α is generated. Within this magnetic field, provided is a driving coil 129 having a frame-like shape, which is secured to the lens frame 121.

In accordance with the electrical current flowing in the coil 129, a driving force for moving the lens frame 121 in a direction perpendicular to a plane including the optical axes O of the lenses 110 and 111 is generated. Accordingly, by controlling the electrical current flowing through the coil 129, the lens frame 121 can be driven to move in the direction perpendicular to a plane including the optical axes O.

As shown in FIG. 6, a slit 130 is formed on the lens frame 121, and a light emitting device 132 and a position sensitive device (PSD) 133 are provided with the slit 130 located therebetween. The PSD 133 is elongated in the direction where the lens frame 121 moves. Accordingly, output of the PSD 133 represents the position of the lens frame 121.

If the compensation mechanism 120 is used in place of the compensation mechanism 37 in FIG. 4 and the lenses 110 and 111 are positioned such that the optical axes OT intersect the lenses 110 and 111, respectively, the lenses 110 and 111 are movable in a direction perpendicular to the plane including the optical axes OT. Thus, the compensation mechanism 120 functions as the up/down compensation mechanism.

The compensation mechanism 120 can also be used in place of the compensation mechanism 47 in FIG. 4. In this case, the lenses 110 and 111 are to be positioned such that the optical axes OP intersect the lenses 110 and 111, respectively. The lenses 110 and 111 are movable in a direction perpendicular to the plane including the optical axes OP. Thus, the compensation mechanism 120 functions as the right/left compensation mechanism.

As described above, according to the compensation mechanism shown in FIGS. 4 through 6, since the erecting prism system is divided into sub prisms, it becomes possible to obtain a space where light corresponding to an image which is rotated by 90 degrees with respect to the reversed image formed between the objective lens and the erecting prism. Accordingly, the compensation mechanism having the same structure can be used for compensating the hand vibration in the up/down direction and the hand vibration in the right/left direction. That is, the up/down compensation mechanism 37 and the right/left compensation mechanism 47 have the same structure. Since the same structure is employed, the number of parts for the up/down and right/left compensation mechanisms 37 and 47 can be reduced in comparison to a case where the two compensation mechanisms have different structures.

[Third Embodiment]

A compensation mechanism according to a third embodiment of the invention will be described with reference to FIGS. 7 through 9.

Figure 7:
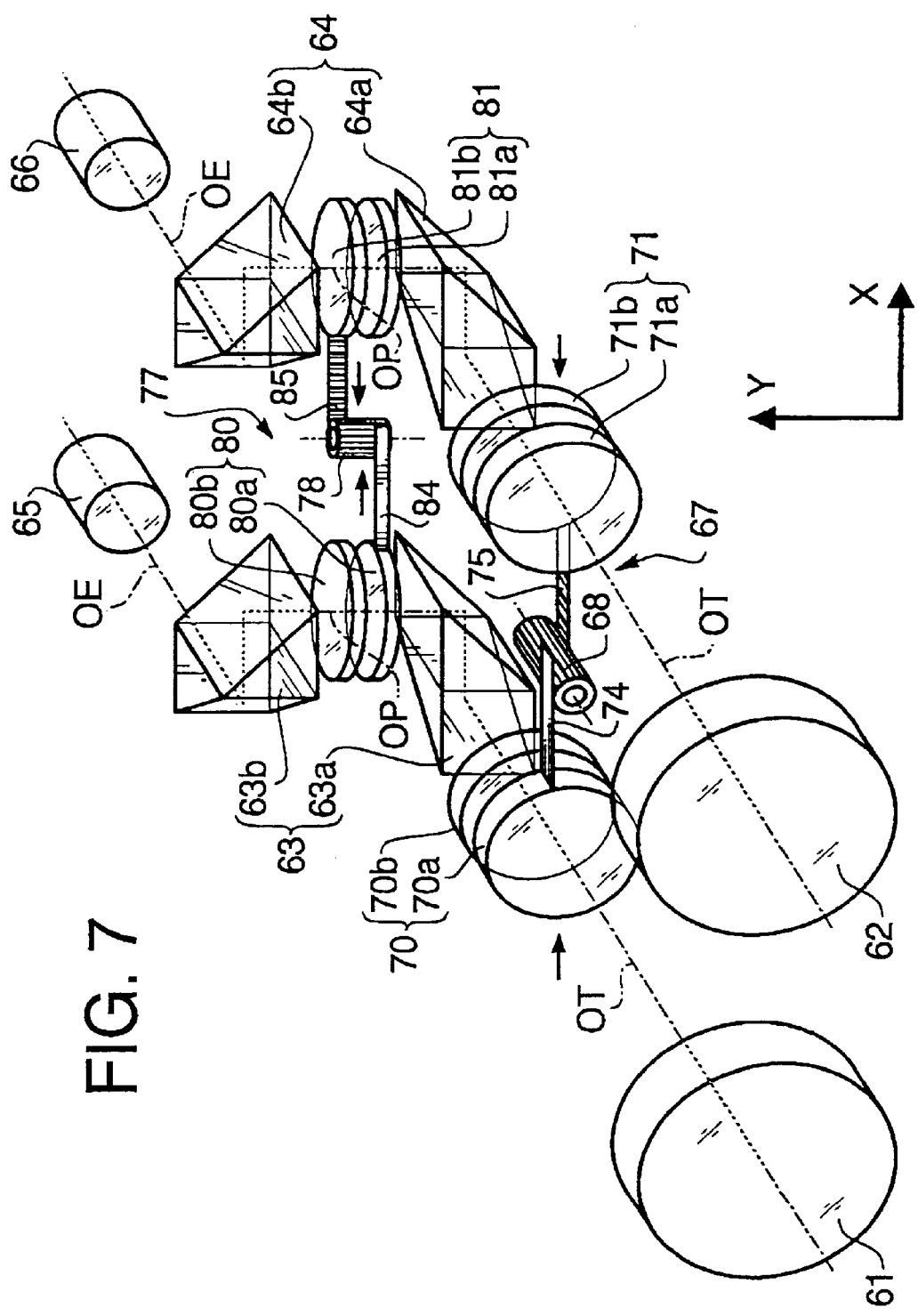
FIG. 7 is a perspective view showing arrangement of optical elements of a binocular according to a third embodiment of the invention.

As shown in FIG. 7, the optical system of the binocular is substantially the same as that in FIG. 1 or 4.

As shown in FIG. 7, the binocular according to the third embodiment includes right and left objective lenses 61 and 62, right and left erecting optical systems 63 and 64, and right and left eyepiece optical systems 65 and 66.

The erecting optical system 63, which is a type II Porro prism, for right eye is divided into first and second sub prisms 63a and 63b; and the erecting optical system 64, which is also the type II Porro prism, for left eye is also divided into first and second sub prisms 64a and 64b.

The optical axis of the right (or left) eye telescopic optical system includes an optical axis OT which extends from the objective lens 61 (or 62) to the erecting optical system 63 (or 64), and optical axis OP defined between the first and second sub prisms 63a and 63b (or 64a and 64b), and an optical axis OE which extends from the erecting optical system 63 (or 64) to the eyepiece lens 65 (or 66). The axes OT and OE are parallel to each other, and the axis OP is perpendicular to the axes OT and OE.

On the optical axis OT, i.e., between the objective lens 61 (or 62) and the erecting optical system 63 (or 64), an image Ia (or Ib) of the object is reversed as shown in FIG. 12. On the optical axis OP, i.e., between the first and second sub prisms 63a and 63b (or 64a and 64b), an image Ic (or Id) which is rotated by 90 degrees with respect to the image Ia (or Ib) is formed (rotated) by the first sub prism 63a (or 64a) as shown in FIG. 13. By the second sub prism 63b (or 64b), the image is erected, which is observed through the eyepiece lens 65 (or 66).

In the third embodiment, a right/left compensation mechanism 67 is placed between the objective lenses 61 and 62, and erecting optical systems 63 and 64.

The right/left compensation mechanism 67 has a motor 69, to the shaft thereof, a pinion gear 68 is fixed. Further, the right/left compensation mechanism 67 has right and left compensation optical systems 70 and 71. The right compensation optical system 70 includes a negative lens 70a and a positive lens 70b, and the negative lens 70a is held by a frame 72. The left compensation optical system 71 includes a negative lens 71a and a positive lens 71b, and the positive lens 71b is held by a frame 73. It should be noted that when the negative lens 70a and the positive lens 71b are decentered in the same direction by the same amount, optical path of the light passed through the negative and the positive lenses 70a and 71b are shifted by the same amount, but in the opposite directions. The positive lens 70b and the negative lens 71a are not movable and fixedly positioned inside the binocular such that optical axes thereof coincide with the optical axes OT, respectively.

Figure 8:
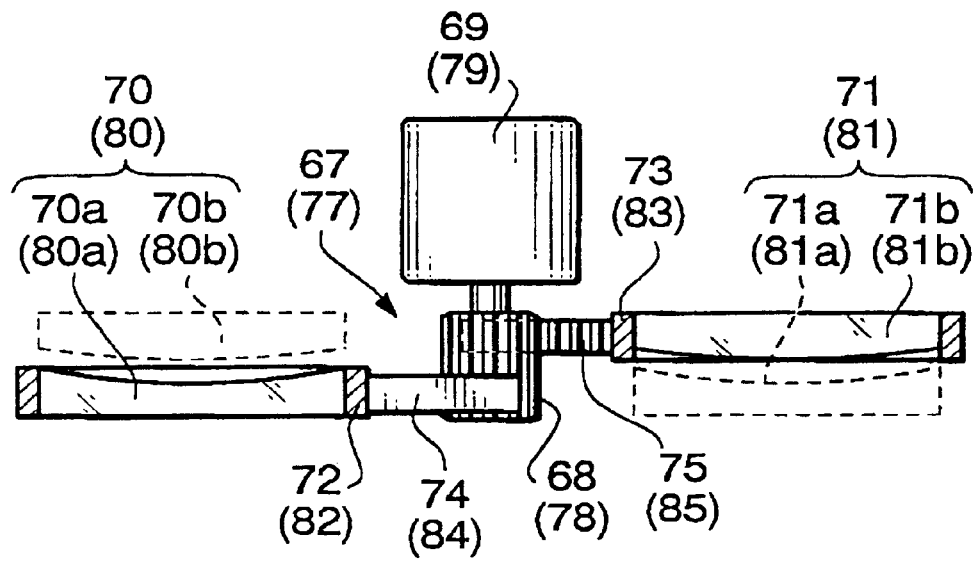
FIG. 8 shows a schematic structure of a hand-vibration compensation mechanism viewed along a direction perpendicular to the optical axis of the binocular shown in FIG. 7.
Figure 9:
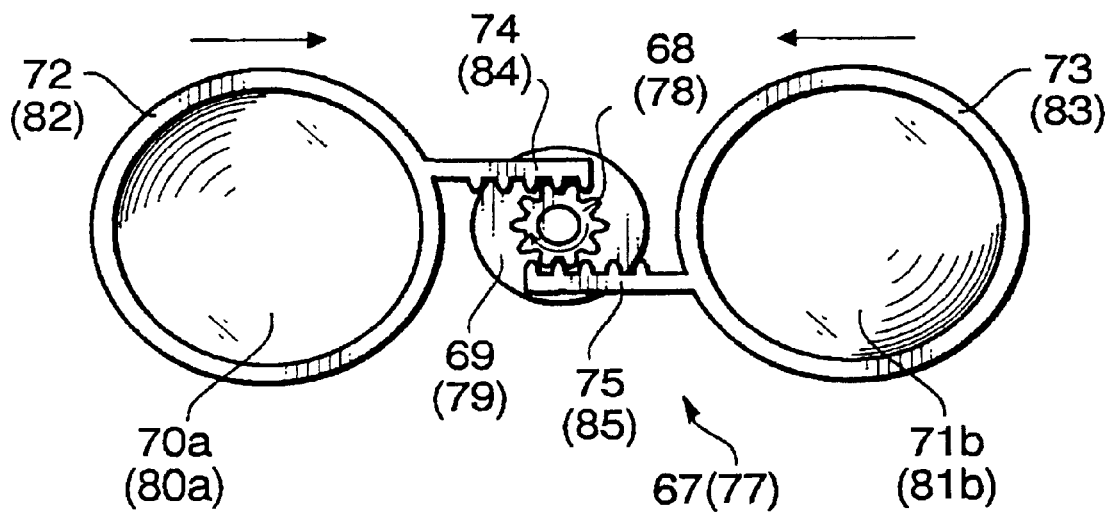
FIG. 9 shows a schematic structure of a hand-vibration compensation mechanism viewed along a direction parallel to the optical axis of the binocular shown in FIG. 7.

As shown in FIGS. 8 and 9, from the frame 72, a right rack 74 which engages the pinion gear 68 is projected. Similarly, from the frame 73, a left rack 75 which engages the pinion gear 68 is projected. As shown in FIG. 9, the rack 74 and the rack 75 extend parallely, and are engaged with the pinion gear 68 at opposite sides. When the pinion gear 68 rotates, the frame 72 and the frame 73 moves along a direction parallel to a plane including the optical axes OT and perpendicular to the optical axes OT, in opposite directions. For example, in FIG. 9, when the pinion gear 68 rotates in clockwise direction, the frame 72 and frame 73 move towards each other, as indicated by arrows.

Since the negative lens 70a is held by the frame 72, and the positive lens 71b is held by the frame 73, although the frames 72 and 73 move in opposite directions, compensation is made in the same direction, and the direction where compensation is made in a direction parallel to the plane including the optical axes of the lenses 70a and 71b and perpendicular to the optical axes of the lenses 70a and 71b. Further, amounts of compensation made by lenses 70a and 71b, when moved by the same amount, are the same.

Between the objective lenses 61 and 62 and the erecting optical systems 63 and 64, reversed images Ia and Ib are formed. Accordingly, by the compensation mechanism 67, the hand vibration in the right/left direction can be compensated.

Between the first sub prisms 80a and 81a, and the second sub prisms 80b and 81b, a compensation mechanism 77 is provided.

The compensation mechanism 77 has the same structure as the compensation mechanism 67. That is, as shown in FIGS. 8 and 9, the compensation mechanism 77 has a motor 79 and the pinion gear 78 which is fixed to the shaft of the motor 79. Further, the compensation mechanism 77 has right and left compensation optical systems 80 and 81. The right compensation optical system 80 includes a negative lens 80a and a positive lens 80b, and the negative lens 80a is held by a frame 82. The left compensation optical system 81 includes a negative lens 81a and a positive lens 81b, and the positive lens 81b is held by a frame 83. As shown in FIGS. 8 and 9, from the frame 82, a right rack 84 which engages a pinion gear 78 is projected. Similarly, from the frame 83, a left rack 85 which engages the pinion gear 78 is projected. It should be noted that when the negative lens 80a and the positive lens 81b are decentered in the same direction by the same amount, optical path of the light passed through the negative and the positive lenses 80a and 81b are shifted by the same amount, but in the opposite directions. The positive lens 80b and the negative lens 81a which are not movable and fixedly positioned inside the binocular such that optical axes thereof coincide with the optical axes OP, respectively.

Between the first sub prisms 63a and 64a, and the second sub prisms 63b and 64b, the images Ic and Id are rotated by 90 degrees, in the same direction, with respect to the images Ia and Ib. Therefore, by the compensation mechanism 77, it is possible to compensate the hand vibration in the up/down direction.

A control system similar to that shown in FIG. 3 or any other suitable control systems can easily be modified to be applicable to the third embodiment. Since the control system has been described above with reference to FIG. 3, description and drawing of the control system applicable to the third embodiment will be omitted.

As described above, according to the compensation mechanism shown in FIGS. 7 through 9, since the erecting prism system is divided into sub prisms, it becomes possible to obtain a space where light corresponding to an image which is rotated by 90 degrees with respect to the reversed image formed between the objective lens and the erecting prism. Accordingly, the compensation mechanism having the same structure can be used for compensating the hand vibration in the up/down direction and the hand vibration in the right/left direction. That is, the right/left compensation mechanism 67 and the up/down compensation mechanism 77 have the same structure. Since the same structure is employed, the number of parts for both the right/left and up/down compensation mechanisms 67 and 77 can be reduced in comparison to a case where the two compensation mechanisms have different structures.

[Fourth Embodiment]

Figure 10:
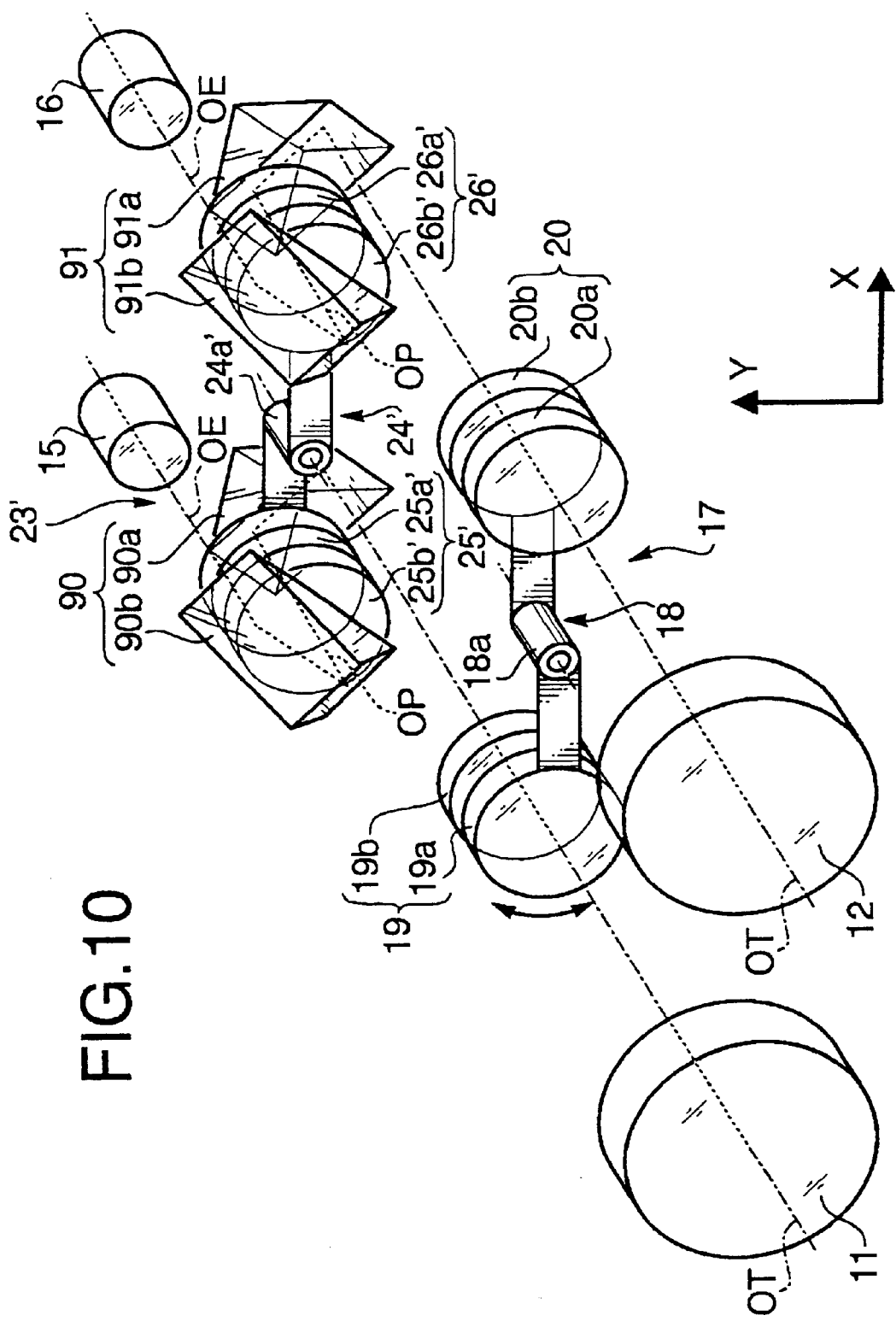
FIG. 10 is a perspective view showing arrangement of optical elements of a binocular according to a fourth embodiment of the invention.
Figure 11:
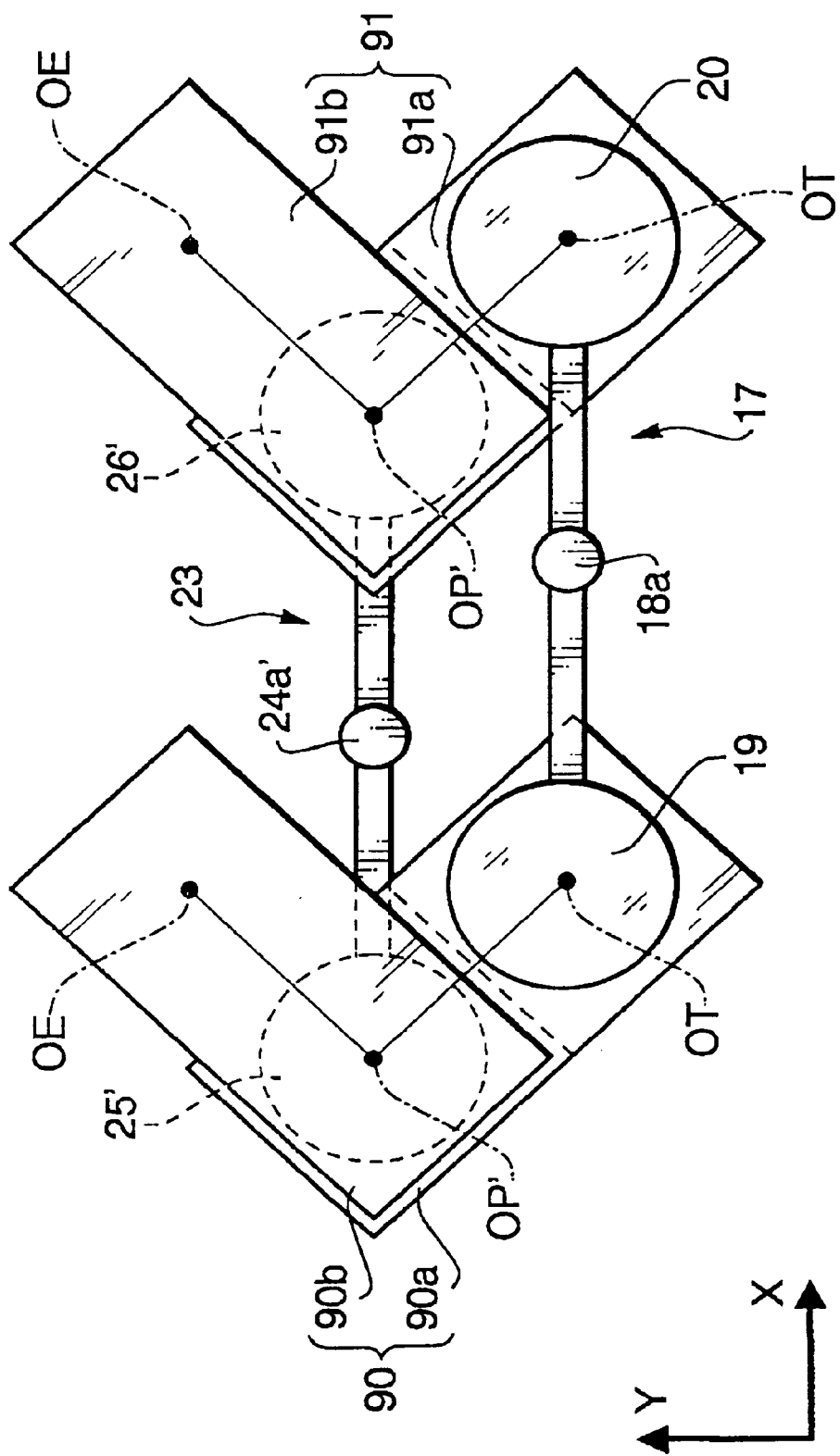
FIG. 11 is a front view showing an arrangement of erecting prisms for the binocular shown in FIG. 10.

FIGS. 10 and 11 show an optical system according to a fourth embodiment, in which a type I Porro prism is employed for erecting optical system. In FIGS. 10 and 11, the same reference numerals are assigned to elements similar to those in FIGS. 1 through 3, and description thereof will be omitted.

The optical system according to the fourth embodiment includes right and left optical systems. The right eye optical system includes an erecting optical system 90. The erecting optical system 90 is the type I Porro prism, and has first and second sub prisms (right angle prisms) 90a and 90b. Each of the sub prisms 90a and 90b has two reflection surfaces, and arranged in a direction parallel to the optical axes OT of the objective lenses 11 and 12. The sub prisms 90a and 90b are arranged such that ridge lines at corners having right angles of the sub prisms 90a and 90b extending in directions perpendicular to each other, and are inclined at an angle of 45 degrees with respect to a plane including the optical axes OT (see FIG. 11). Similarly, the left eye optical system includes an erecting optical system 91. The erecting optical system 91 is the type I Porro prism, and has first and second sub prisms (right angle prisms) 91a and 91b. Each of the sub prisms 91a and 91b has two reflection surfaces, and arranged in a direction parallel to the optical axes OT of the objective lenses 11 and 12. The sub prisms 91a and 91b are arranged such that ridge lines at corners having right angles of the sub prisms 91a and 91b extending in directions perpendicular to each other, and are inclined at an angle of 45 degrees with respect to a plane including the optical axes OT.

Since the first sub prisms 90a and 91a are inclined at 45 degrees with respect to a plane including the optical axes OT, light beam reflected twice by each of the sub prisms form images Ic and Id (FIG. 13), which are rotated by 90 degrees with respect to the images Ia and Ib (FIG. 12) in the clock-wise direction. The images Ic and Id are further rotated by 90 degrees by the second sub prisms 90b and 91b, respectively, and are observed as erected images.

Similar to the first embodiment, between the objective lenses 11 and 12, and erecting optical systems 90 and 91, the up/down compensation mechanism 17 is inserted. The structure of the compensation mechanism 17 is similar to that in the first embodiment, and will not be described.

A right/left compensation mechanism 23' is provided between a pair of first sub prisms 90a and 91a, and a pair of second sub prisms 90b and 91b.

The right/left compensation mechanism 23' has the same structure as the up/down compensation mechanism 17. The right and left compensation mechanism 23' includes a rotatable arm 24' which is located between the right and left optical axes OP, which are defined between the first sub prisms 90a and 91a, and the second sub prisms 90b and 91b, and extends in a direction parallel to the optical axis OP. The rotatable arm 24' is made rotatable about an rotation axis 24a'.

The right and left compensation mechanism 23' includes right and left compensation optical systems 25' and 26', each of which includes a negative lens 25a' (26a') and a positive lens 25b ' (26b') which are arranged along the optical axis OP. The negative lens 25a and the positive lens 26b are held by the right compensation lens holding frame (nor shown) and the left compensation lens holding frame (not shown), respectively. The positive lens 25b ' and the negative lens 26a', which are not held by the lens holding frames 24b and 24c are fixed inside the binocular such that the optical axes thereof coincide with the optical axes OP and OP, respectively.

Since the images Ic and Id are rotated by 90 degrees with respect to the images Ia and Ib, trembling of the image due to the hand vibration in the right/left direction can be compensated by the right/left compensation mechanism 23'. It should be noted that, in the fourth embodiment, the light beam traveling along the optical axes OP' proceeds from the eyepiece side towards the object lens side. Accordingly, the compensation mechanism 23' is directed to the opposite direction with respect to the direction of the compensation mechanism 17, in the fourth embodiment. However, as described above, the structure of the compensation mechanisms 17 and 23' are the same, and the number of parts for the right/left and up/down compensation mechanisms 23' and 17 can be reduced in comparison to a case where the two compensation mechanisms have different structures.

It should be noted that the compensation mechanism 17 and 23' can be replaced with the other type of the compensation mechanism employed in the other embodiments.

A control system similar to that shown in FIG. 3 can easily be modified to be applicable to the fourth embodiment, and accordingly, description and drawing of the control system applicable to the fourth embodiment will be omitted.

As described above, according to the invention, the erecting optical system includes a Porro prism which is divided into two sub prisms separately arranged. With this construction, it is possible to place a compensation mechanism between the sub prisms, and the up/down compensation mechanism and the right/left compensation mechanism can be made to have the same structure.

It should be noted that, in the embodiments, the reversed images formed by the objective lenses are rotated in the clock-wise direction by the first sub prisms. It is not limited to this direction, and the sub prisms may be arranged to rotate the reversed images in the counterclockwise direction.

In the above-described embodiments, the erected images are observed through the eyepiece lenses. The invention is not limited to this particular structure, and is applicable to a binocular in which imaging devices (e.g., a CCD: a Charge Coupled Device) and an imaging lenses are used in place of, or in association of the eyepiece lenses.

The present disclosure relates to the subject matter contained in Japanese Patent Application No. HEI 09-331658, filed on Dec. 2, 1997, which is expressly incorporated herein by reference in its entirety.

What is claimed is:
1. A binocular, comprising:
a pair of telescopic optical systems, each of said pair of telescopic optical systems having an objective lens system, an erecting optical system, and an observing optical system, said erecting optical system of each of said telescopic optical systems including a first prism and a second prism, said first prism and said second prism respectively having two reflection surfaces;
a first hand vibration compensation mechanism that compensates trembling of image due to a hand vibration in a first direction which is perpendicular to a plane including optical axes of both of said telescopic optical systems;
a second hand vibration compensation mechanism, that compensates trembling of image due to a hand vibration in a second direction perpendicular to both of said telescopic optical systems, and perpendicular to said first direction,
wherein one of said first and second hand vibration compensation mechanism is provided between said objective lens system and said erecting optical system, and the other of said first and second hand vibration compensation mechanism is provided between said first prism and said second prism.
2. The binocular according to claim 1, wherein said first prism of each of said telescopic optical systems rotates an image formed by said objective lens system in the same direction by 90 degrees.
3. The binocular according to claim 2, wherein said first hand vibration compensation mechanism and said second hand vibration compensation mechanism have the same structure.
4. The binocular according to claim 3, wherein said same structure comprises:
a rotatable arm which is rotatable about an axis defined at a center of the optical axes of both of said telescopic optical systems;
a pair of compensation lenses held at both ends of said rotatable arm, said pair of lenses being inserted in optical paths of both of said telescopic optical systems; and
an actuator to be controlled to rotate said rotatable arm.
5. The binocular according to claim 3, wherein said same structure comprises:
a movable frame which is movable in a direction perpendicular to an plane including the optical axes of both of said telescopic optical systems;
a pair of compensation lenses held by said movable frame, said pair of lenses being inserted in optical paths of both of said telescopic optical systems; and
an actuator to be controlled to move said movable frame.
6. The binocular according to claim 3, wherein said same structure comprises:
a movable frame which is movable in a direction perpendicular to an plane including the optical axes of both of said telescopic optical systems;
a pair of compensation lenses held by said movable frame, said pair of lenses being inserted in optical paths of both of said telescopic optical systems;
a magnet field generating system which generates a magnet field around said movable frame; and
a coil fixed to said movable frame,
wherein, when electrical current flows through said coil, said movable frame is driven to move in said direction perpendicular to said plane including said optical axes of both of said telescopic optical systems.

7. The binocular according to claim 3, wherein said same structure comprises:

a pair of frame members respectively holding compensation lenses which are inserted in optical paths of both of said telescopic optical systems, each of said frame members being movable in a direction perpendicular to both optical axes of said telescopic optical systems; and an actuator to be controlled to move said pair of frame members simultaneously in opposite directions.

8. The binocular according to claim 1, wherein said first and second prisms constitute a type I Porro prism.

9. The binocular according to claim 1, wherein said first and second prisms constitute a type II Porro prism.

* * * * *